(12) United States Patent
Buck et al.

(10) Patent No.: US 11,697,136 B2
(45) Date of Patent: Jul. 11, 2023

(54) AUTOMATED LINK CHAIN CLEANING AND LUBRICATING SYSTEM

(71) Applicant: BBLink, LLC, Holmen, WI (US)

(72) Inventors: Robert Buck, Holmen, WI (US); John Thomas Benton, Holmen, WI (US)

(73) Assignee: BBLINK, LLC, Holmen, WI (US)

( * ) Notice: Subject to any disclaimer, the term of this patent is extended or adjusted under 35 U.S.C. 154(b) by 276 days.

(21) Appl. No.: 16/992,460

(22) Filed: Aug. 13, 2020

(65) Prior Publication Data

US 2021/0046518 A1 Feb. 18, 2021

Related U.S. Application Data

(60) Provisional application No. 62/886,114, filed on Aug. 13, 2019.

(51) Int. Cl.
*B08B 3/02* (2006.01)
*B08B 13/00* (2006.01)
*C10M 101/04* (2006.01)
*C10M 109/00* (2006.01)
*C10M 111/06* (2006.01)
*C10M 125/20* (2006.01)
*C10M 125/10* (2006.01)
*C10M 169/04* (2006.01)
*B08B 3/08* (2006.01)
*C10N 40/00* (2006.01)
*B62J 31/00* (2006.01)
*B62J 50/16* (2020.01)
*C10N 30/20* (2006.01)

(52) U.S. Cl.
CPC ............... *B08B 3/022* (2013.01); *B08B 3/08* (2013.01); *B08B 13/00* (2013.01); *C10M 101/04* (2013.01); *C10M 109/00* (2013.01); *C10M 111/06* (2013.01); *C10M 125/10* (2013.01); *C10M 125/20* (2013.01); *C10M 169/04* (2013.01); *B62J 31/00* (2013.01); *B62J 50/16* (2020.02); *C10M 2201/062* (2013.01); *C10M 2201/082* (2013.01); *C10M 2203/003* (2013.01); *C10M 2205/183* (2013.01); *C10N 2030/20* (2013.01); *C10N 2040/38* (2020.05)

(58) Field of Classification Search
CPC ..................................................... B08B 3/022
See application file for complete search history.

(56) References Cited

U.S. PATENT DOCUMENTS 3,903,994 A * 9/1975 Hafner .................... F16N 7/38
118/679
4,891,037 A 1/1990 Maples
5,898,022 A 4/1999 Maples
(Continued)

FOREIGN PATENT DOCUMENTS

CN 102965178 B 10/2014

OTHER PUBLICATIONS

"Relja Novovic et al. ""Bicycle Chain Lubricants—explained""", Mar. 30, 2017, retrieved from the Internet on Oct. 28, 2020: https://bike.bikegremlin.com/1986/bicycle-chain-lubricants-explained/".

(Continued)

*Primary Examiner* — Jason Y Ko
(74) *Attorney, Agent, or Firm* — Stiennon & Stiennon

(57) ABSTRACT

A link chain cleaning and lubricating device, and lubricants for use therein.

18 Claims, 14 Drawing Sheets

(56) References Cited

U.S. PATENT DOCUMENTS

| 6,257,369 B1* | 7/2001 | Pesl ........................ F16N 7/00 |
| | | 184/15.3 |
| 2006/0081518 A1* | 4/2006 | Yee ........................ B01D 29/52 |
| | | 210/90 |
| 2011/0118156 A1 | 5/2011 | Rühle et al. |

OTHER PUBLICATIONS

International Search report for International Application No. PCT/US2020/046127 dated Jan. 22, 2021, 21 pages.
"Ceramicspeed Friction Facts Chain Lube Tests", Dec. 13, 2013, retreived from the Internet on Apr. 16, 2021: https://www.ceramicspeed.com/media/3505/velonews-friction-facts-chain-lube-tests-combined.pdf.

* cited by examiner

CROSS SECTION OF CHAIN AT PIN

AUTOMATED LINK CHAIN CLEANING AND LUBRICATING SYSTEM

CROSS REFERENCE TO RELATED APPLICATION

This application claims the benefit of U.S. Provisional Application 62/886,114, filed Aug. 13, 2019, the disclosure of which is incorporated by reference herein.

FIELD AND BACKGROUND OF THE INVENTION

The present invention relates generally to cleaning and lubricating bicycle chains, and in particular to apparatus and methods for automatically cleaning and lubricating bicycle chains, and to link chain lubricants. One purpose of the invention is to automate the dirty, tedious, and potentially environmentally harmful task of cleaning and lubricating a bicycle chain, and to do so while it is still on the bike.

Bicycling has been an important mode of transportation and recreation for well over a hundred years. There are hundreds of millions of bicycles being used around the world. Bicycles reduce effort and increase speed in transporting oneself from point A to point B. Bicycles are used to transport freight and make deliveries.

There have been many efforts for decreasing the effort needed to pedal a bike. Reducing weight, decreasing rolling resistance, body position, advanced gear-trains, and reducing friction. Almost all bicycles use chains and meshed gears to transmit the human power to the rear wheels.

The bicycle chain has proven to be reliable, cheap and efficient. The average bicycle chain has over a hundred connected and moving parts. The metal-to-metal contact points between these moving parts and meshed gears need lubrication to maintain efficient operation. Riding with a dirty, rusty, gritty chain requires much more effort to pedal. Dirty, gritty drive chains also cause premature wear of expensive gear clusters and chain rings. A dirty chain adds another dimension to the task of fixing a rear flat by making removal and reassembly of the rear wheel a greasy mess.

Regular chain maintenance is a must for any bicyclist. Chain maintenance includes degreasing the chain and the application of a suitable lubricant at regular intervals. Degreasing is necessary to remove the old lubricant and the accumulation of dirt, grit and metal filings that have built up. Failure to do this and applying lubricant to a dirty chain just pushes the dirt and grit further into the chain components, accelerating wear. To degrease the chain there are currently three methods being used.

1. Chain on bike using a spray can of degreaser and a rag. The degreaser is applied liberally to the chain while turning the crank and moving the chain. A rag is used to wipe up the excess degreaser.
2. Chain on bike using a manual degreasing device and a rag. The cleaning device is a hand held unit filled with solvent that 'brush' the chain clean as it is rolled through the unit. Excess solvent is wiped off the chain with the rag.
3. Chain off bike cleaned in solvent bath. This method requires that the chain be unlinked and removed from the bike and placed in a solvent. The chain is then manually cleaned with a hand brush.

These methods do not adequately clean the grit out where it matters most—between the pins and bushings. There are two types of chains being used on bicycles today older style bushing and modern bushing-less. Bushing-less chains do have a 'bushing,' but it is created as part of the punch process during manufacturing instead of being a separate part. Bushing type chains have 10 parts per link whereas bushing-less chains have 8 parts per link.

Wear is concentrated on the inside of the chain link at the pin and bushing interface. Manually applying degreaser to the outside and wiping the outside with a rag is not very effective in flushing out all grit inside the pins and bushings and can actually push dirt further into the cracks and crevices. The same with the manually operated machines, which brush the outside of the chain and make it look clean but the action does not actively flush the material out of the pins and bushing area. And the manual operated machine recirculates dirty degreaser as it reapplies used, gritty degreaser from the reservoir.

Degreasing solutions can be hard on the humans, materials, and the environment. Degreasing agents normally used for degreasing bike chains are mostly volatile organic compounds that are citric, solvent, alcohol or petroleum based, and can cause the following issues: dehydration of skin; inhalation risks; deterioration of rubbers and plastics; environmental concerns with use and disposal. Some degreasers claim to be biodegradable, but the grease coming off the chain is not.

Bike chain grease is extremely tenacious and manually cleaning the chain is a messy job. Degreaser overspray can occur or it can spill. It gets on rims, tires, paint and the like and also the surrounding area. Removing a dirty chain is a really messy job and usually requires using a special tool to drive out a link pin and then having a new master link or a new pin when reinstalling the chain. Adding split links to facilitate easy removal and reinstallation adds a weak point to the drive chain and may not fit in drive chains with close gear spacing. It is usually only experienced riders and bicycle shop experts that remove chains for cleaning. Also, removing the chain increases the risk of it being re-installed incorrectly.

Degreasing a chain correctly takes time, even for experienced personnel. To do a proper job, most bicycle shops will remove the chain, take it to a parts washer and manually clean it. The cassette and chain gear are then manually cleaned on the bike or also removed and cleaned in the parts washer. This can take a half an hour or more of a technician's time and can cost a considerable amount in labor just to clean the chain.

Manual degreasing machines are also expensive, and exposure to the degreasing agents will affect the plasticizers in the parts, decreasing their life. Some machines can only be used 5 or 6 times before they start to fail.

Lubrication of the chain is necessary to reduce friction and decrease wear. A 57 link bushed chain, for example, has 570 components that must rotate against adjacent chain parts. The most important part to lubricate is the pin and bushing interface. The chain lubricant needs to be refreshed regularly as it wears out or is washed out.

There are many different lubricants on the market with varying properties used for varying reasons. Petroleum based oils, waxes, ceramics and Teflon (PTFE). Some lubricants are sticky and last long, but they may also attract dirt and grit that can exacerbate chain wear. Some lubricants use a volatile carrier with dry lubricants that evaporates quickly, leaving just the lubricating element behind. These types of lubricants are not sticky, but normally do not last long, especially in inclement weather. Simple paraffin wax has been shown to be the most effective lubricant. Paraffin wax also does not attract dirt and stays relatively clean. This is advantageous as that touching the chain during tire changes or inadvertently with ones calve when riding does not leave black marks like other lubricants do. The life of the paraffin application is relatively long with some recommending reapplication every 300 miles of riding, but one rider claiming 650 miles before needing to retreat. The advantage could be due to the fact that as the paraffin wears from the friction points, the chain heats up, causing paraffin in the surrounding areas to melt and flow back in to the friction areas.

Methods used to lubricate the chain include: drip, spray, and waxing. Drip application takes place while slowly advancing the chain, lubricant is dripped onto each pin. This tedious method reduces the excess lubricant on the chain that will attract dirt in the future. An alternate method is to slowly turn the crank while applying a steady stream of lubricant to the chain in general. The crank is then turned another 20 to 30 seconds to distribute the lubricant. Then a rag is held against the chain as it is rotated to remove any excess lubrication. Depending on the type of lubrication it will have to be reapplied on a regular basis.

Spray application is similar to the alternate drip method in that the lubricant is sprayed on the entire chain and the excess is wiped off.

Paraffin waxing requires the chain to be removed, degreased, dried and then submerged in a hot wax bath. The chain is allowed to cool and then is reinstalled on the bike.

There are challenges in lubricating bike chains properly. The first is completely degreasing the chain before adding more lubricant. Lubricating a dirty chain can keep fresh lubricant from reaching where it is needed and can actually push dirt further into the key wear areas. The second is finding the type of lubricant that will meet the users' biking requirements. Liquid lubricants that will last in adverse conditions, like mountain biking, commuting and touring, require frequent cleaning and lubricating. Liquid lubricants usually have a grease or oil base that can attract dirt and grit, causing rapid wear of the chain contact points. Liquid lubricants need to be replenished every 50 to 200 miles depending on the tenacity of the lubricant and riding conditions. Road bike riders prefer 'Dry' lubricants, because they have powdered lubricants suspended in solvent that are applied to the chain. The solvent evaporates, leaving the powdered materials behind. Chains stay cleaner, but once the dry powder has been worn off the friction points, there is no 'flow' to replenish the material back into the wear points. To reliably use these 'Dry' lubricants usually requires the user to reapply new lubricant at the end of every ride.

Finally, environmental considerations can affect the choice of lubricants. Most lubricants are oil or solvent based and are not good for the environment, so selecting a chain lubricant that is not harmful to the environment can be difficult.

Finally, lubricant needs to be applied evenly to ensure full penetration or flow to all friction points. This means applying extra lubricant and wiping off the excess or meticulously manually applying lubricant to just the pin area, and to make sure all pins get the correct amount of lubricant.

The best lubricant is hot wax, but the application is time consuming and requires special skill to remove the chain and apply the wax. Creating the hot wax bath can also be dangerous.

Thus, there is a need for improved bicycle chain cleaning and lubrication devices and methods, as well as improved lubricants that are not harmful to the environment.

SUMMARY OF THE INVENTION

The present invention for a lubricant includes a combination of organic oils, waxes, lubrication enhancers, and other non-toxic additives. The lubricity is improved with the oils and additives while the natural waxes keep the lubrication in a semisolid state until the heat from friction causes the mixture to heat up and transfer more lubrication to the wear points. The mixture includes all natural and environmentally friendly oils and waxes. Lubrication enhancers can be used, such as nano-sized boron nitride particles that provide additional anti-friction properties. The mix ratio for the ingredients can be adjusted to vary the viscosity of the final product, for example. The amounts of each ingredient may have to be adjusted to make up for variability found in natural ingredients, and provide consistent results. Testing has shown that combinations of materials from Table 1 Mixture Components perform better than existing alternatives with less frequent application.

TABLE 1

Mixture Components

| Organic Oils | Waxes | Inorganic Additive | Enhancers |
| --- | --- | --- | --- |
| Apricot Kernel | Beeswax | Boron Nitride | Color |
| Avocado | Candelilla | Molybdenum Disulfide | Plant Extracts |
| Canola | Carnauba | Neodymium Oxide | (i.e. *Nasternum*) |
| Castor | BayBerry | Tungsten Disulfide | Preservatives |
| Coconut | Paraffin | PTFE (i.e. Teflon ™) | Sensor Tracers |
| Hemp Oil | Micro- | | Shellac |
| Palm Kernel | crystalline | | |
| Peanut Oil | | | |
| Red Palm Oil | | | |
| Walnut Oil | | | |

The lubricant of the present invention has superior lubricity, provides decreased chain wear, rust prevention, has longer effectiveness than dry and liquid based chain lubricants, even in adverse conditions, does not attract as much dirt, does not affect equipment finishes, carbon fiber, plastics or other surfaces, and is safe for the environment.

The present invention is also directed to a device for cleaning and lubricating a link chain, the device having a housing defining a chain passage; a chain drive system joined to the housing to define a chain path; a cleaning fluid nozzle joined to the housing and directed toward the chain path; and a lubricant applicator joined to the housing and directed toward the chain path.

The device may also include an opposing cleaning fluid nozzle disposed in a substantially opposing direction to the cleaning fluid nozzle, and directed toward the chain path. An air nozzle can be joined to the housing and directed toward the chain path.

The chain drive may include a link chain sprocket and disposed to engage a link chain while the link chain is mounted on a chain-driven device.

The lubricant applicator can include a lubricant heater to improve coverage and provide a more durable lubricant.

A lubricant fluid trough can be provided through which the chain path passes for immersion in a lubricant. A cleaning fluid trough could also be used.

A cleaning fluid pump can be provided in fluid communication with the cleaning fluid nozzle; and a controller in communication with cleaning fluid pump can be programmed to dispense cleaning fluid through the cleaning fluid nozzle. The controller can be programmed to activate the pump to accommodate any predetermined factor, and the controller can be adjusted using fuzzy logic or overridden by an operator using a key pad or other suitable interface.

A cleaning fluid collection reservoir is preferably used to receive cleaning fluid from the cleaning fluid nozzle. A recycle filter in fluid communication with the cleaning fluid collection reservoir can be included to conserve cleaning fluid.

DETAILED DESCRIPTION OF THE INVENTION

Figure 1:
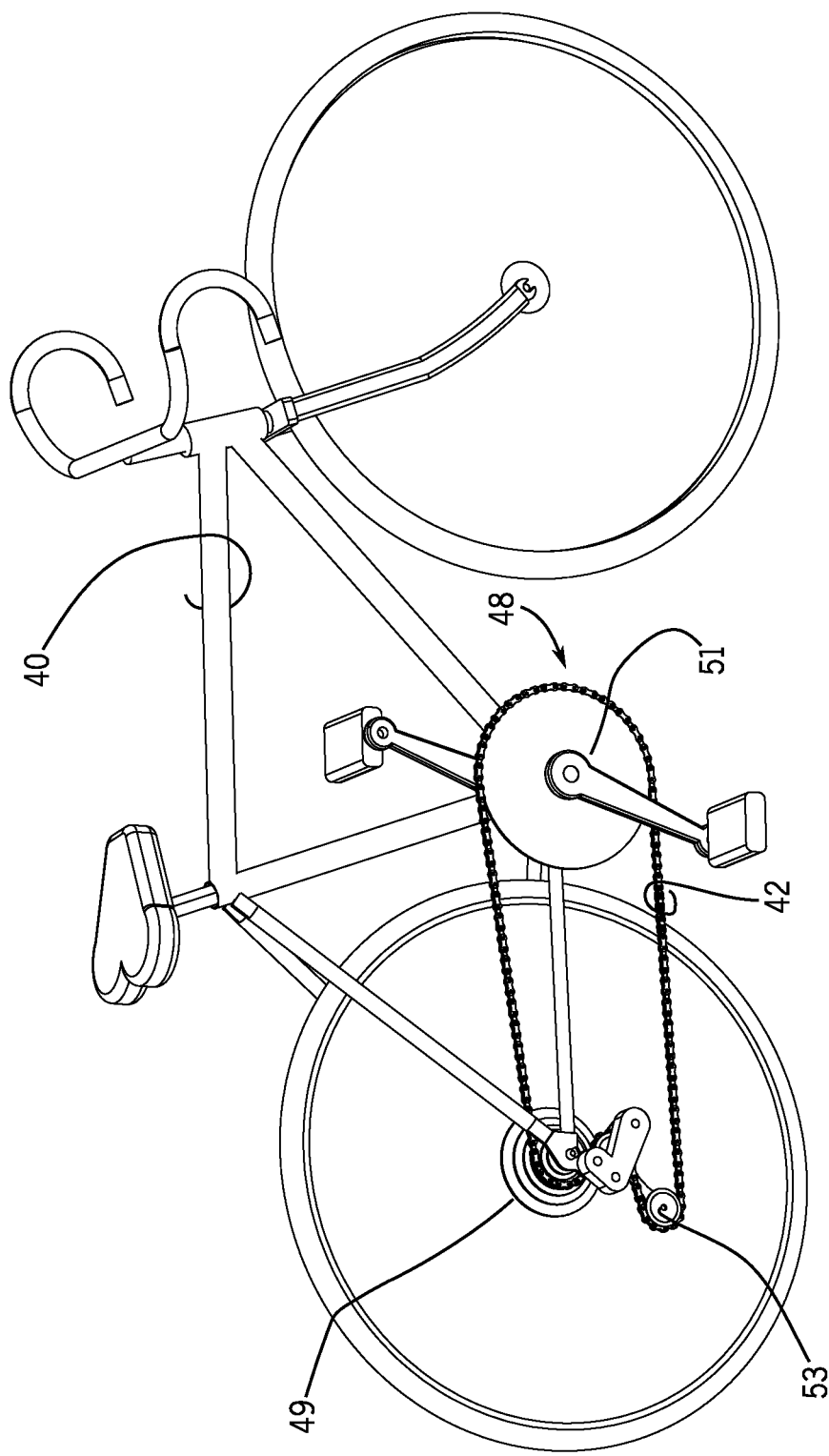
FIG. 1 is a perspective view of a bicycle with a link chain and gear drive system.

In the following detailed description of the invention, the same reference numeral will be used to identify the same or similar part in each of the drawings. The materials identified for manufacturing the device are preferred, but other materials and device configurations are possible within the scope of the present invention.

Figure 2:
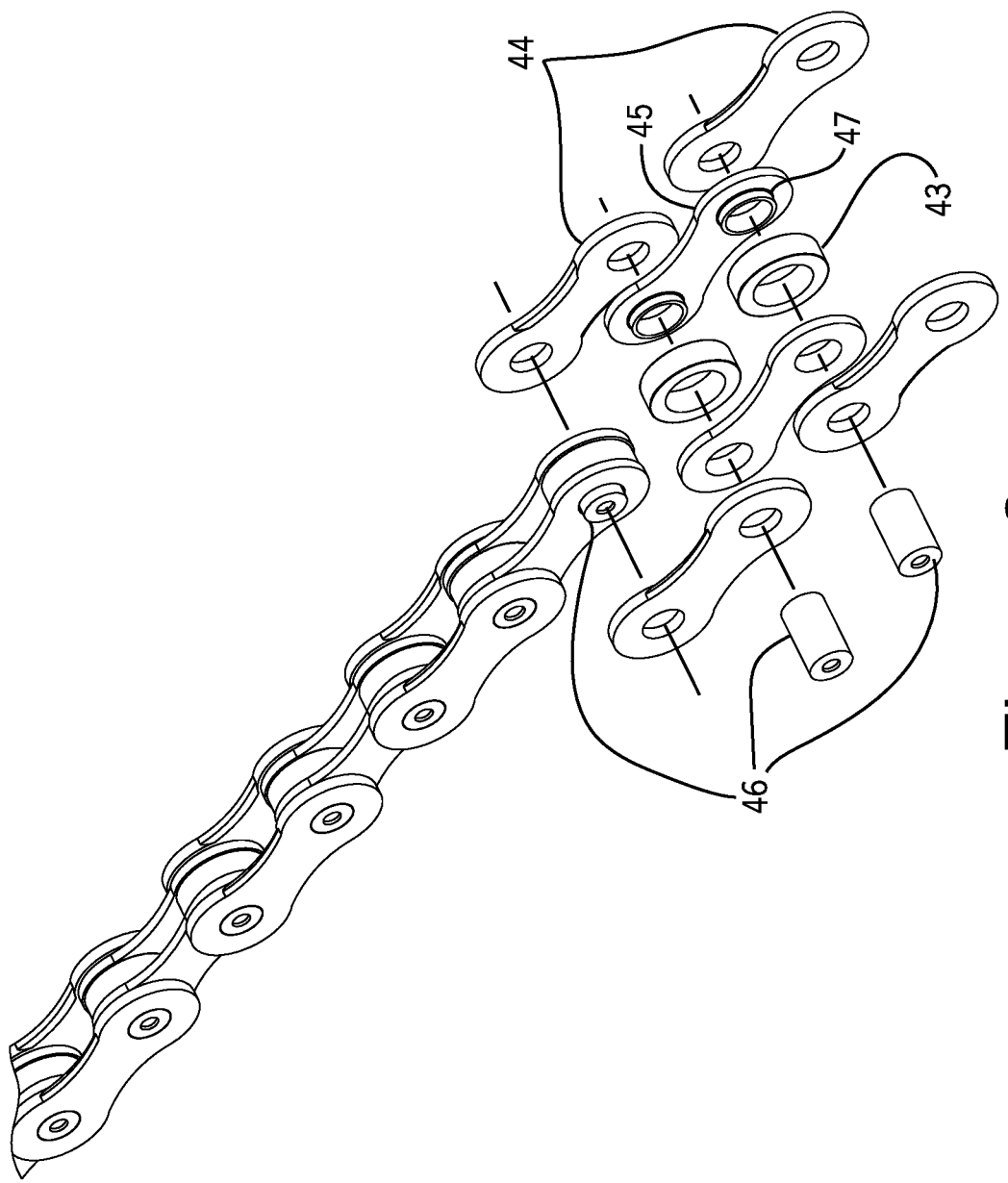
FIG. 2 is a partial perspective and exploded view of a bicycle chain.

Generally, FIG. 1 depicts a bicycle 40 with a bicycle link chain 42 (referred to simply as a "chain" below). The chain 42 (FIG. 2) typically includes chain plates 44, 45, pins 46, rollers 43, and integral bushings 47. As seen in FIG. 2, the chain 42 parts are joined together for movement relative to one another and around a bicycle drive train system 48, including cluster gears 49 and a chain ring 51. The chain 42 parts are subject to friction and the elements such as rain, snow, dirt, and temperature extremes, for example. The present invention is directed to devices and methods for cleaning the chain 42 parts and applying a friction-reducing lubricant to and between the chain parts.

Figure 3:
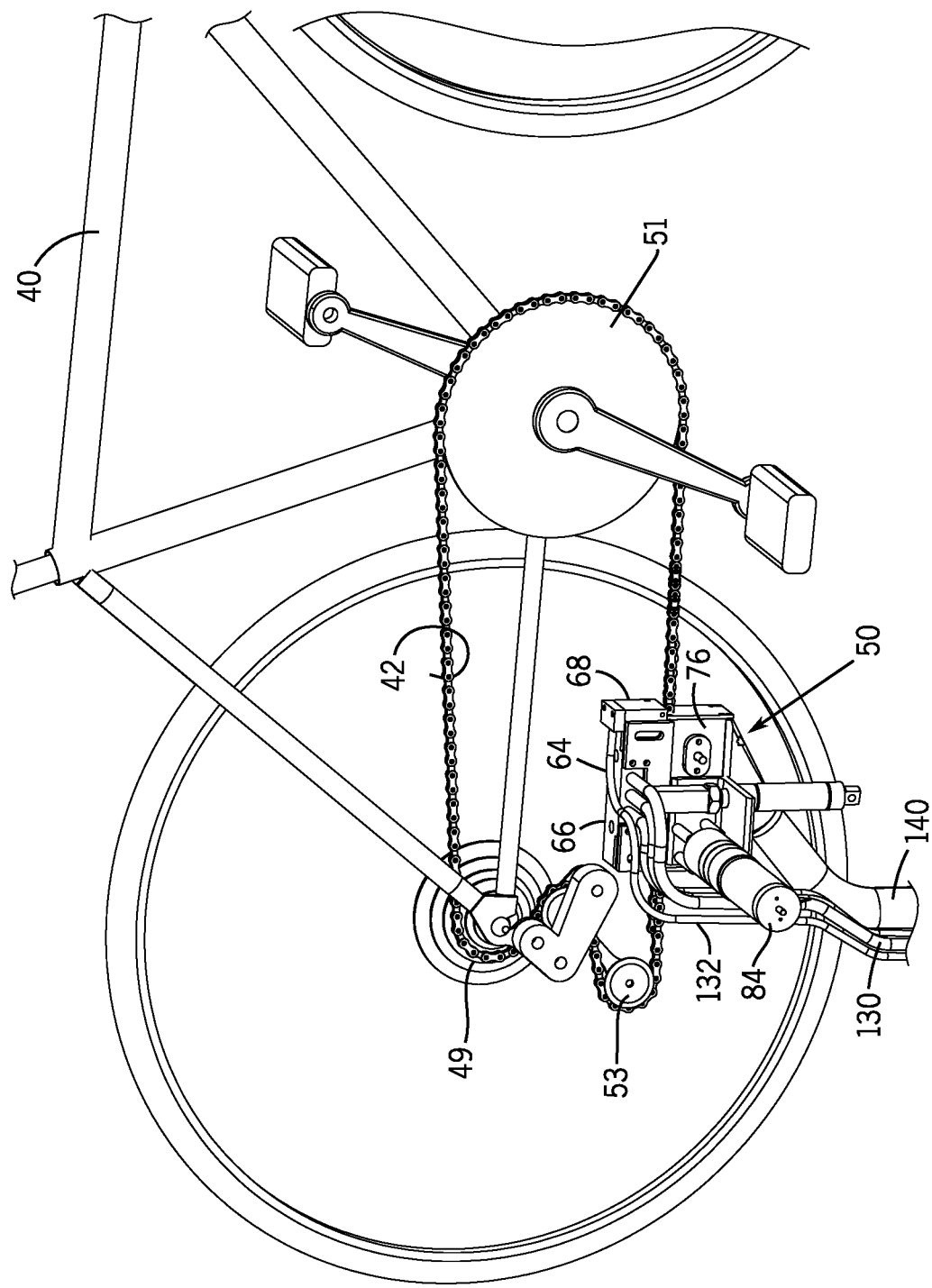
FIG. 3 is the bicycle of FIG. 1 with a cleaning and lubricating device in an operating position around the link chain, in accordance with the present invention.
Figure 4:
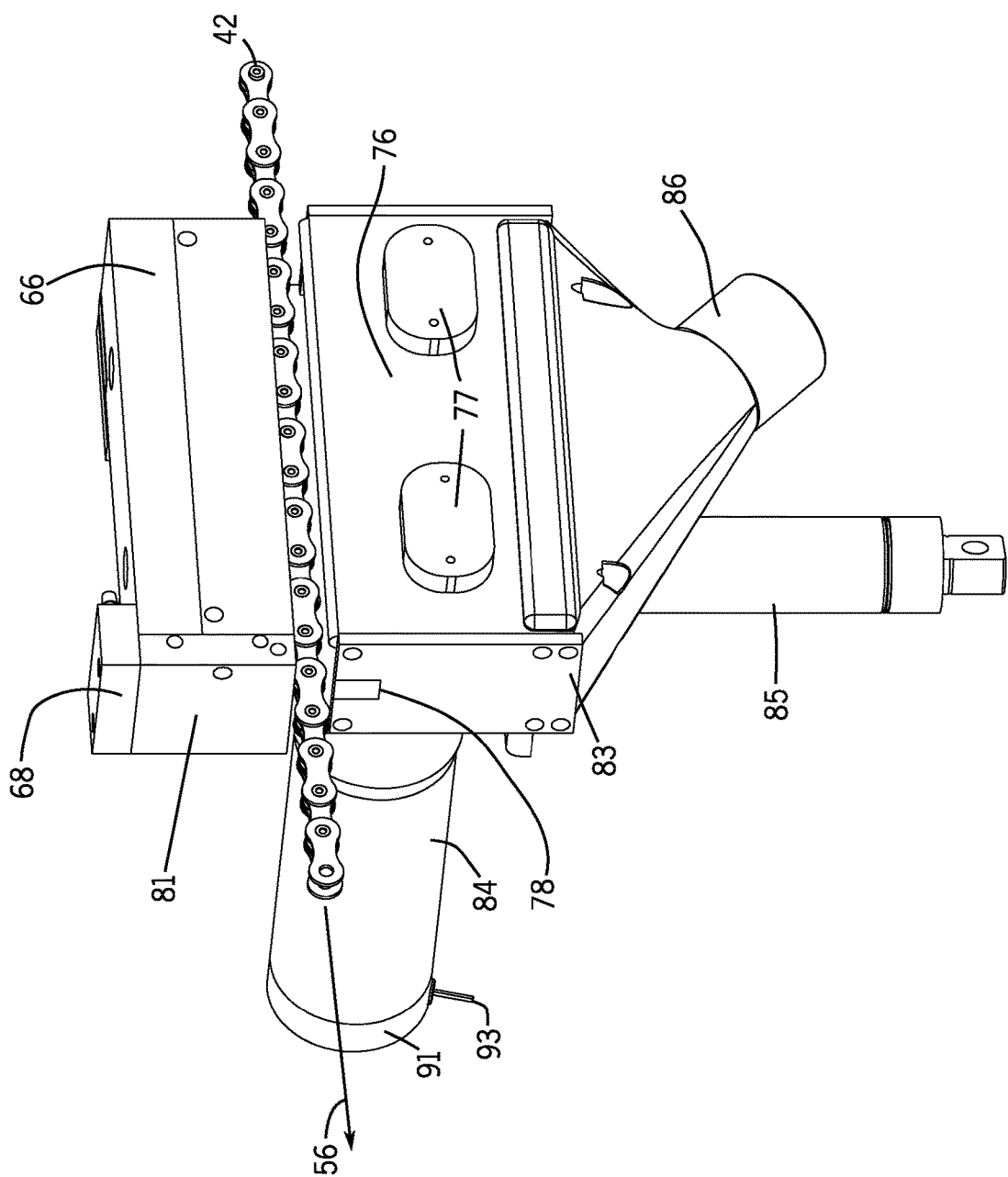
FIG. 4 is a perspective view of an embodiment of a cleaning and lubricating device having an open chain path in the housing.
Figure 5:
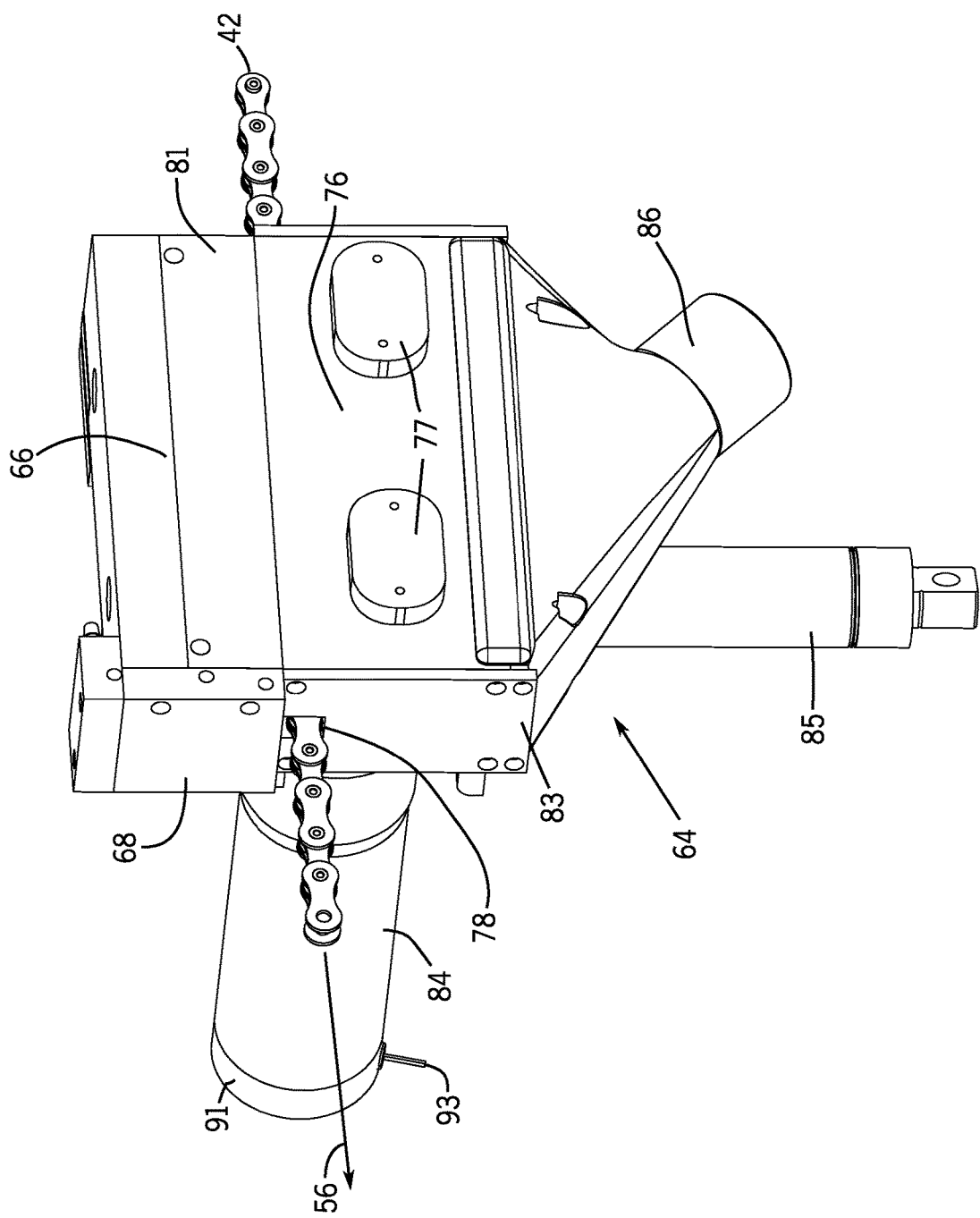
FIG. 5 is a perspective view of an alternate embodiment of a cleaning and lubricating device having a closed chain path through the housing.
Figure 6:
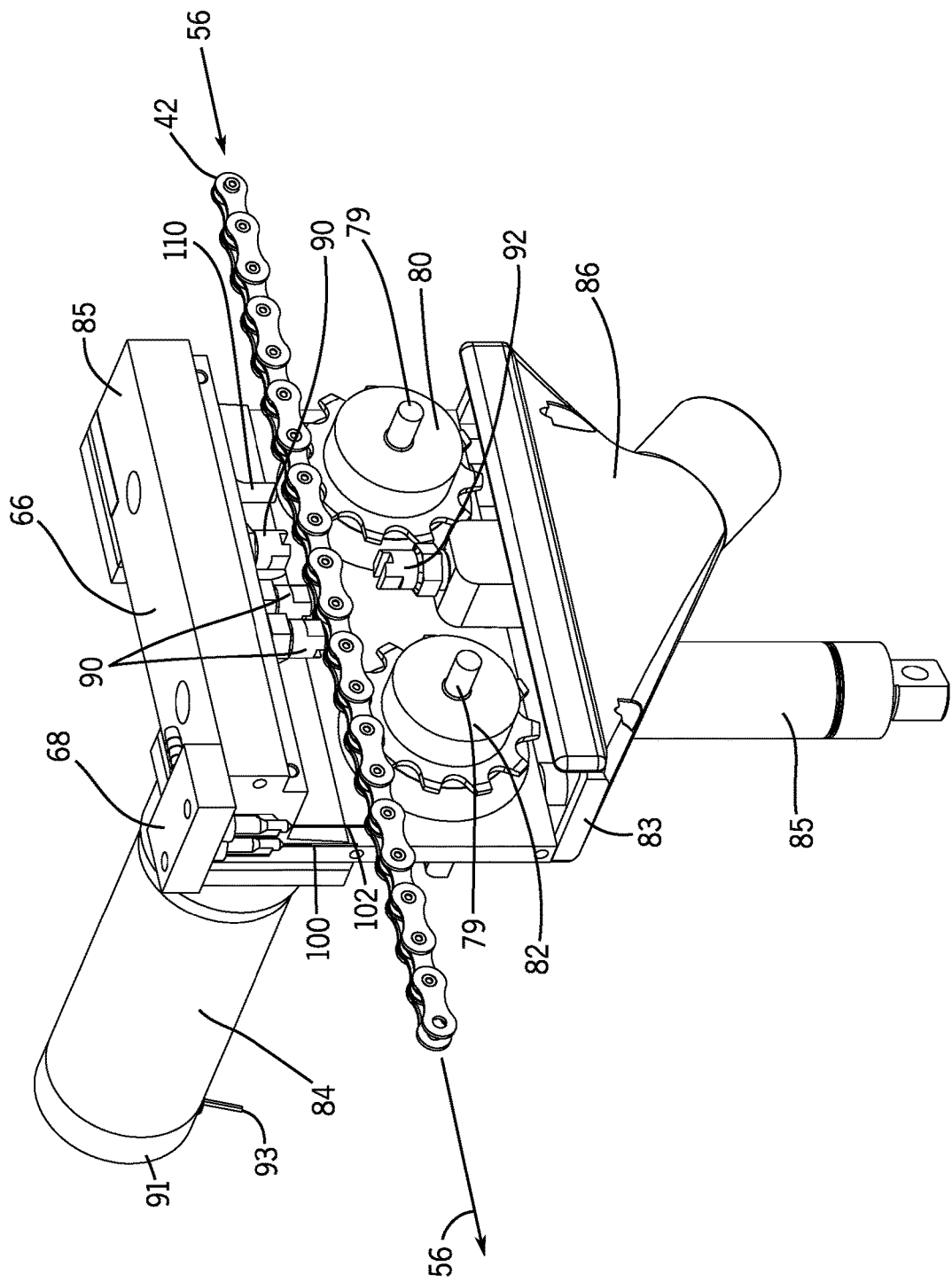
FIG. 6 is a perspective view of the cleaning and lubricating device with a portion of the housing removed to illustrate internal components.
Figure 14:
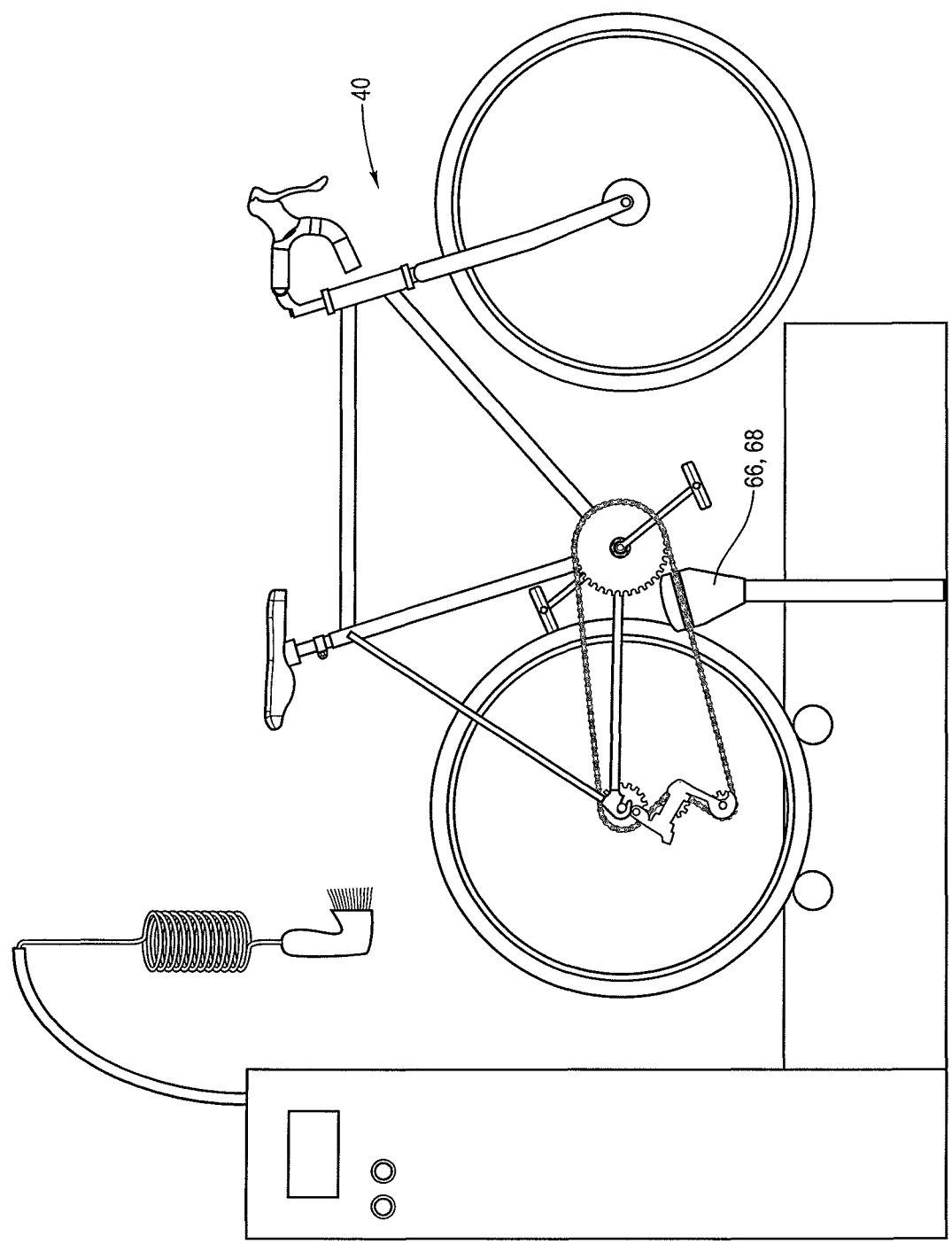
FIG. 14 is a schematic view of the invention of FIG. 3 showing the modules with respect to a bicycle.

Illustrated generally in FIG. 3 is a cleaning and lubricating device 64 in accordance with the present invention, including: a cleaning module 66 and a lubricating module 68 and shown with respect to a bicycle 40 on which a chain is mounted in FIG. 14. The terms "cleaning" and "degreasing" are used interchangeably herein and are used to describe removal of dirt, grease, debris, or cleaning fluid to expose the surfaces of chain parts prior to lubricating. The illustrated housing 76, as seen in FIGS. 4 to 6, defines a chain passage 78 through which the chain 42 passes while being cleaned and lubricated. The chain passage 78 can be an open slot in the housing 76 (FIG. 4) or the housing 76 can be hinged or assembled with parts to encompass the chain 42 (FIG. 5), and preferably retain or minimize the amount of dirt, cleaner, and lubricant that can escape the housing 76 during operation. The direction of chain 42 travel through the housing 76 is preferred to be in a normal direction of travel for the chain 42 around the drive train system 48, but the reverse direction and intermittent travel are also possible. The chain 42 travels in a predetermined chain path 56, and the nozzles, brushes, heater, and other components are directed toward, and/or are adjacent to, the chain path 56. The spaces between chain parts and their respective exposed surfaces are cleaned in the cleaning module 66 and then lubricated in the lubricating module 68.

The chain 42 can be drawn through the housing 76 chain passage 78 using any desired external or internal drive device. Preferably, the cleaning and lubricating device 64 includes a first sprocket 80, a second sprocket 82, and a sprocket drive unit 84 that engage the chain 42 and move the chain 42 through the chain path 56 as described below. A suitable hand-operated or motor driven driver 84 can be used to rotate the sprockets 80 and 82 to move the chain 42 through the device 64. (FIG. 6)

To clean between chain parts, one or more high pressure nozzles 90, 92 and compressed air jets 110 are located to focus a spray of cleaner, for example ArmaKleen's™ Bio24™, against the chain 42, to deep clean the pin 46 and bushing 47 area, for example. The nozzles 90 and jets 92 are located in a compact enclosed 'head' assembly 112 that directs the spray of pressurized fluid over the chain 42 and into a collection and recycle area 116.

To efficiently clean the cluster gears 49 and chain ring 51, a special pressurized brush 122 can be used. (See FIG. 12.)

In addition, a lubrication module 68 dispenses chain lubricant after the cleaning.

As seen in FIGS. 4 and 5, for example, the cleaning module 66 and lubricating module 68 could be incorporated into a single module housing 76 in which both functions are performed or be separated into separate housings to segregate the fluids and debris. This type of equipment could be located at the local bike shop or other convenient location. A chain service using the present invention can be done quickly while a patron waits even at remote locations because the present invention operates without removing the chain 42.

In FIGS. 4 and 5, the housing 76, chain passage 78 receives the chain 42 for movement along the chain path 56. The housing 76 can be moved into place around the chain 42 by moving the housing 76 laterally or the chain 42 can be inserted laterally into the chain passage 78.

Preferably, the housing 76 includes an upper portion 81 and a lower portion 83 joined by suitable guides, so that they can move apart and open (FIG. 4) or move together to close the chain passage 78 (FIG. 5) for ease of inserting and removing the chain 42. An air cylinder 85 is preferably used to move the upper portion 81 or the lower portion 83 or both. The air cylinder 85 is preferred, but a motor or hand-operated mechanism can be used as well.

Also, the housing 76, as illustrated in FIGS. 4 and 5, includes the chain drive 84 for rotating the sprockets 80 (FIG. 6) and driving the chain 42 through the housing 76. The chain drive 84 can operate continuously or intermittently to index the chain 42 at an optimum location for a preferred amount of time for cleaning and/or lubricating specific chain parts.

Further, an encoder 91 can be included with the chain drive 84 to provide proper indexing or to control the number of passes the chain 42 makes through the housing 76. A power cable 93 is provided for the drive unit and encoder 91.

As illustrated in FIGS. 4 and 5, the housing 76 also includes bearing holders 77 that support axles 79 for the sprockets 80 and 82 that are illustrated in FIG. 6.

The overspray collector 86 is also illustrated as an extension of the housing 76, but other overspray collection arrangements are possible.

Figure 7:
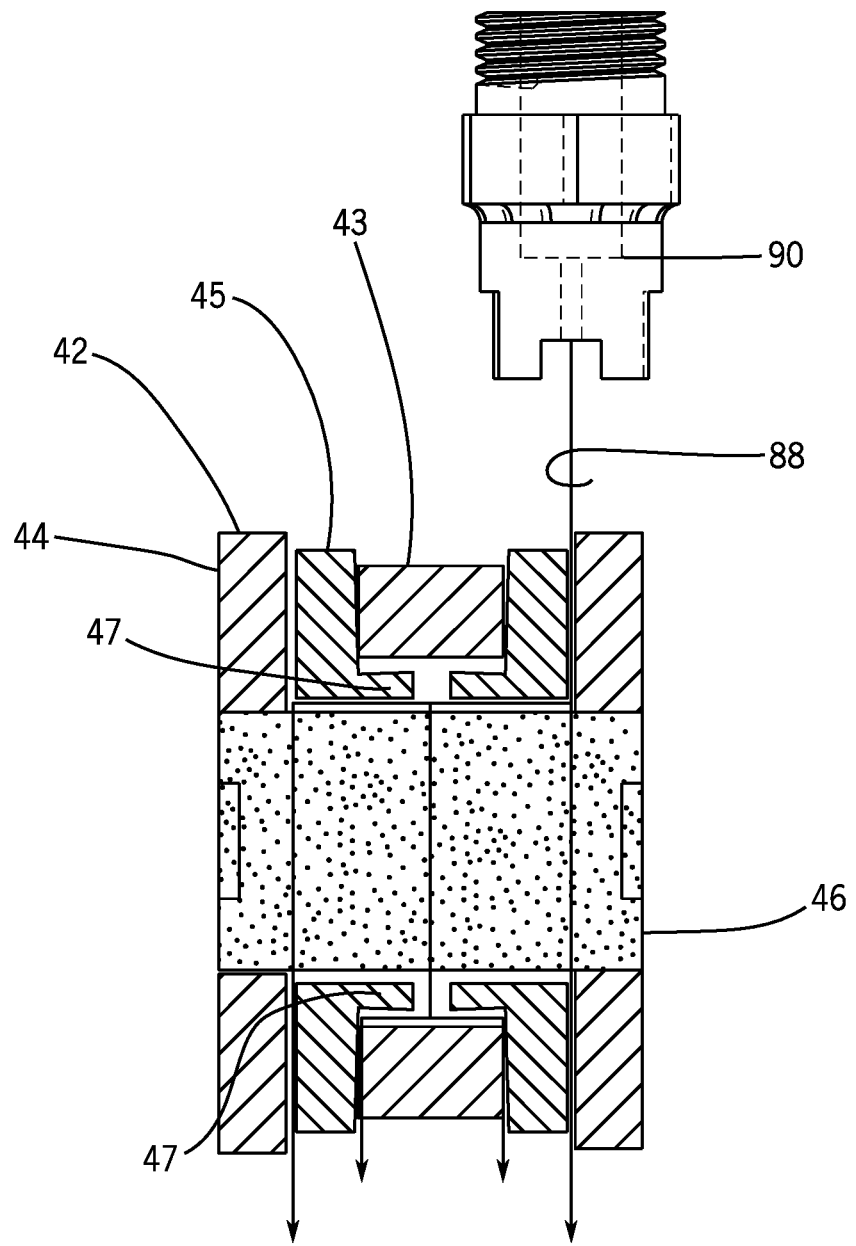
FIG. 7 is an end view of a nozzle and flow paths through a cross-section of a link chain at a pin location.
Figure 8:
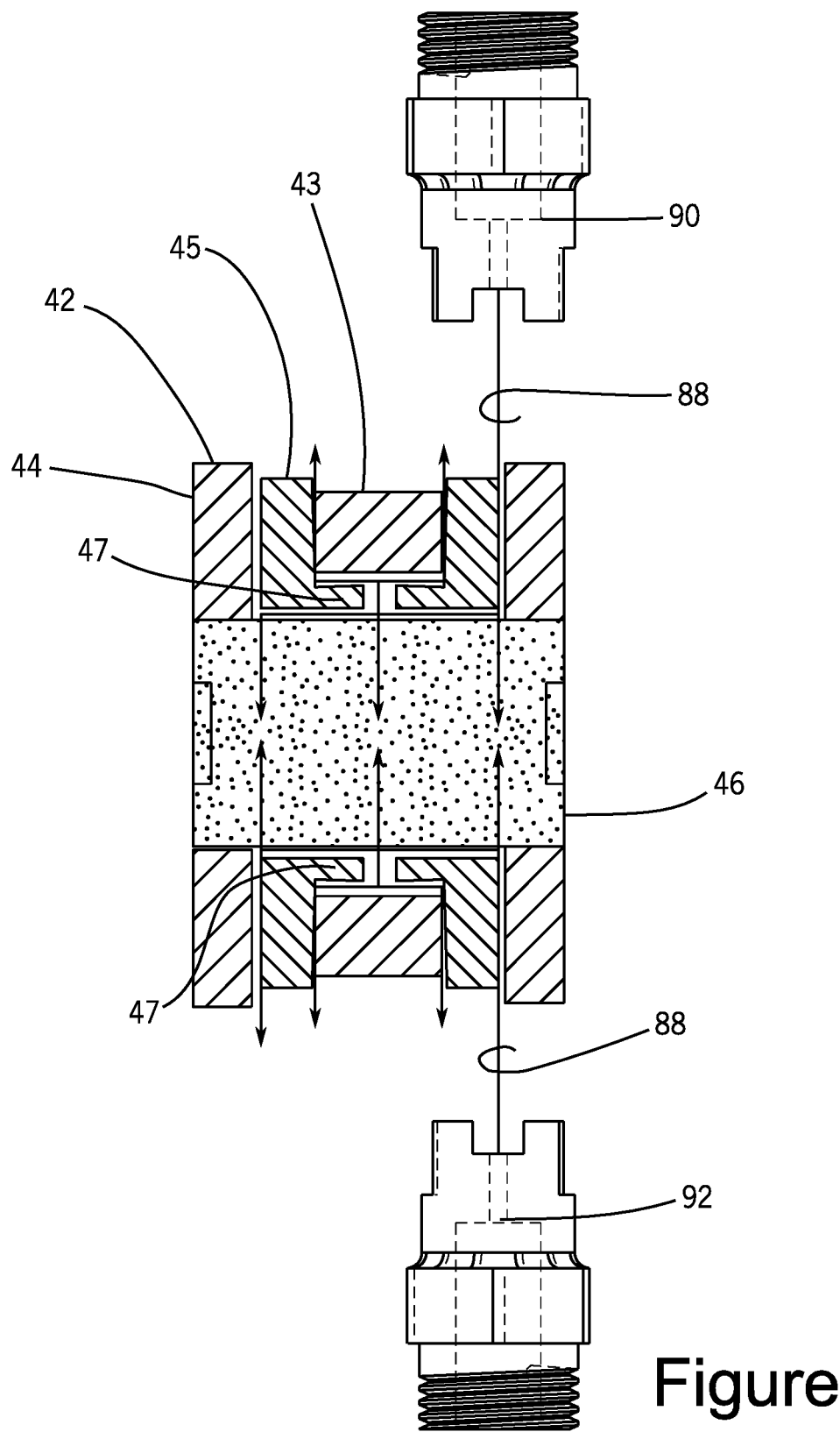
FIG. 8 is an end view of an opposing pair of nozzles and flow paths through a cross-section of a link chain at a pin location.

As seen in FIGS. 6 to 11, the cleaning module 66 contains the nozzles 90 and jets 92 that are used to direct degreaser liquid toward the chain 42 for cleaning. As seen in FIGS. 7 and 8, the nozzles 90 are preferably disposed close to the chain 42 and directed between chain parts to maximize effectiveness, but other arrangements are possible. Getting grit out of the roller 43 and pin 46 and bushing 47 area is important, so nozzles 90 are preferably directed to those locations, for example. One way to do this is to concentrate a high-pressure stream from the nozzle 90 down between the inner 45 and outer 44 chain plates at the pin area 46 (see FIGS. 7 and 8). The nozzle pressure can vary, and be 30 psi to 40 psi, but higher pressures are preferred. A more preferred pressure range is about 500 psi to about 1,000 psi. Nonetheless, nozzle size and shape, as well as the properties of the cleaning fluid can have a beneficial impact on performance.

The flow of cleaning fluid 88 under pressure will clean out between the plates 44, 45, but also some of the flow will travel along the pin 46. In one embodiment, it is preferred to spray at least some of the cleaning fluid 88 toward one side of the chain 42 between the inner 44 and outer 45 plates so that the flow of cleaning fluid 88 will flush out material between the pin 46 and bushing 47. (See FIG. 7.) When more than one nozzle 90 is used, the nozzles 90 can be spaced apart and directed at different angles, preferably one chain link apart. The cleaning of the pin 46 and bushing 47 interface can be enhanced by indexing the chain to position the cleaning nozzles to the desired part of the chain for extended periods. Indexing can be done mechanically or by utilizing a sensor connected to the sprocket drive control to move the chain intermittently during the process.

Preferably, the nozzles 90 are a flat pattern nozzle with the flat spray pattern arranged parallel to the chain plates 44 and 45 to provide maximum flow into the space between the inner and outer plates 45, 44. To increase the flow into the pin area 46, the second nozzle 92 could be an opposing nozzle directed to apply pressure from an opposing side of the chain plates 45, 44 to increase the flow through the pin/bushing interface (see FIG. 8.) The nozzles 90 can dispense cleaning/degreasing solution followed by compressed air to force remaining cleaning/degreasing solution off of the chain 42 at the end of the degreasing cycle. Separate nozzles for cleaning solution 90 and air 110 can also be used. Additional nozzles 90 and air jets 110 can be aimed at other portions of the chain 42 to clean and remove grit and residual degreaser. Brushes 106 or wipers can also be used to contact the chain 42 and assist in cleaning exterior portions of the chain 42. (See FIG. 10.)

Figure 9:
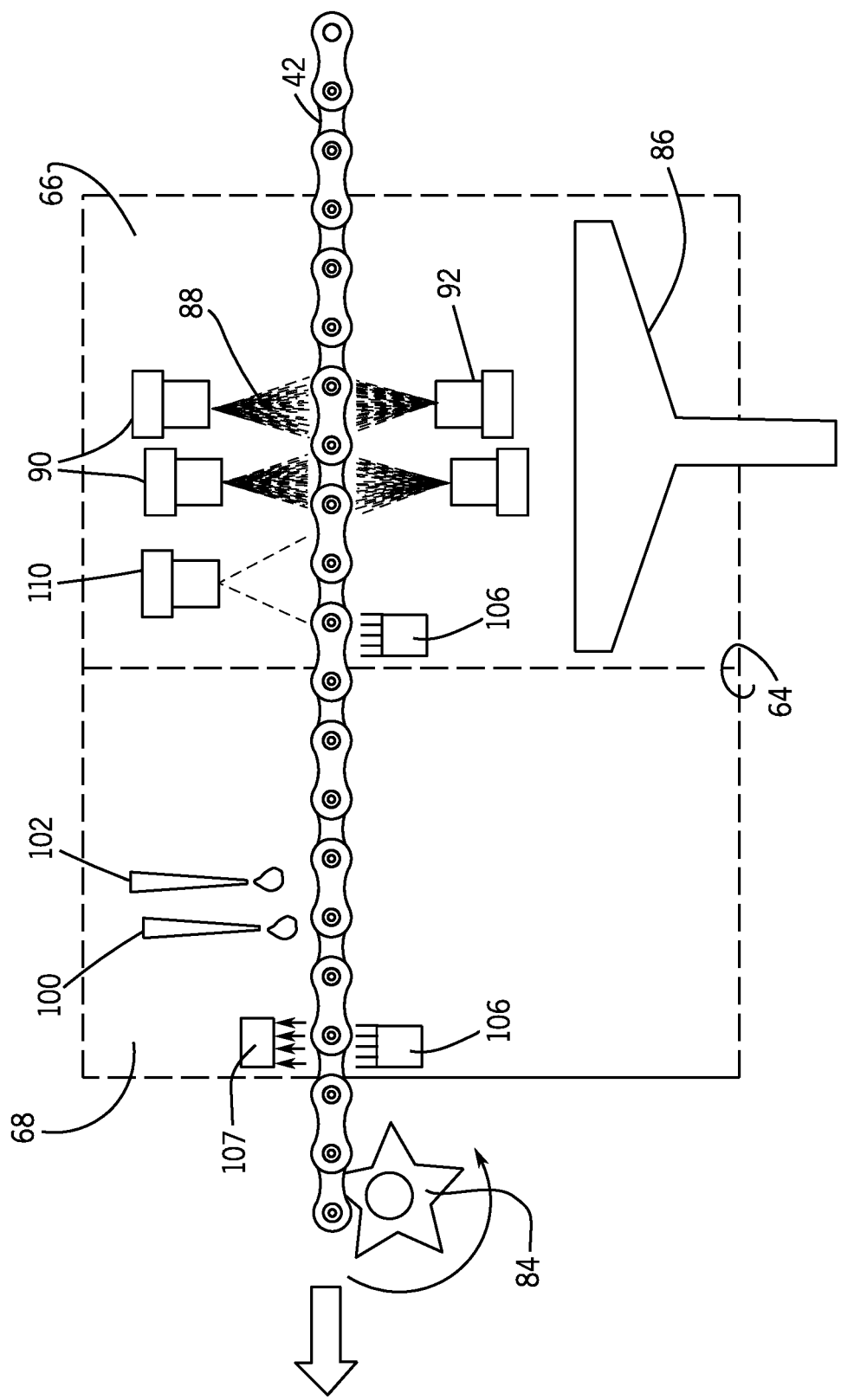
FIG. 9 is a schematic view of internal components of a device in accordance with the present invention.
Figure 10:
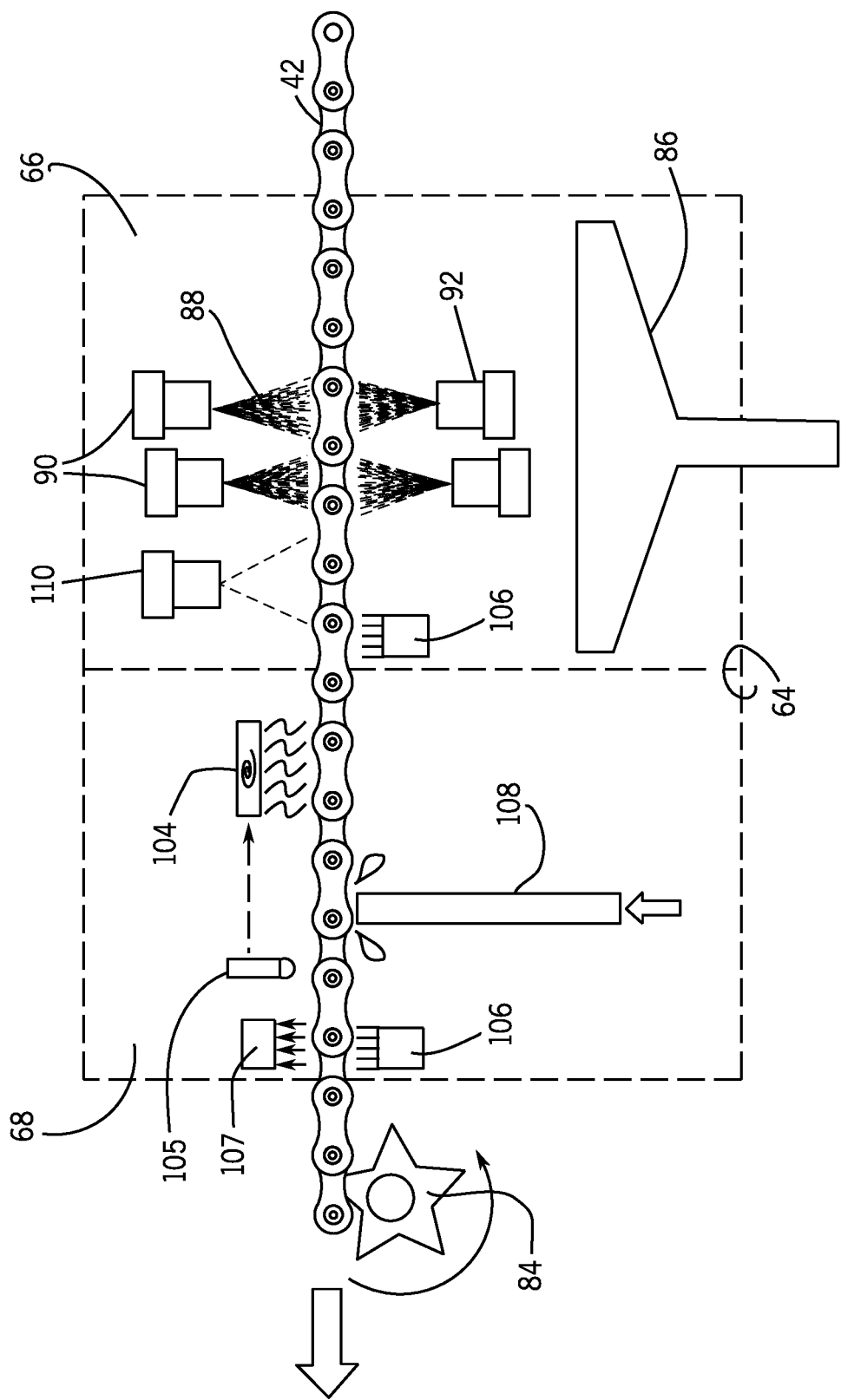
FIG. 10 is a schematic view of an alternate embodiment of internal components of a device in accordance with the present invention.

As illustrated in FIGS. 9 and 10, a preferred cleaning module 66 includes at least two spray nozzles 90 and preferably three for directing fluid 88 toward the chain path 56. The nozzles 90 can be directed toward different sides of the chain or have different sizes to spray larger or smaller areas, as desired. The nozzles 90 inside a housing 76 are preferably aligned to the chain 42, so that the nozzles 90 spray between the inside 45 and outside 44 plates. Opposing nozzles 92 can also be used. The pressure to the nozzles 90 and 92 is provided from any suitable source, including a pressure washer, for example, or any other suitable air/water pressure supply. Fluid pressure is preferably between 500 and 1000 psi, as explained above. Air pressure is preferably in a range from 50 psi to about 120 psi. Further, in addition to or in place of the pressure nozzles 90, vacuum nozzles can be provided to draw fluid and dirt through the chain 42 parts and away from the chain 42. Using vacuum minimizes overspray and waste.

Also, to minimize waste, an overspray collector 86 can be used to collect cleaning fluid, dirt, and grease from the chain 42. The collected fluid can be disposed of safely or preferably recycled for a later chain cleaning operation. (A system for recycling the fluid is described below.)

As stated above, lubricant can be applied using first and second nozzles 100 and 102, either under pressure or dripping from gravity (FIG. 9) or be melted onto the chain 42 using heat to melt a solid lubricant 108 (FIG. 10) that melts when in contact with the chain or is dripped on in melted form using another heat source. A suitable chain temperature could be approximately 250° F.

Figure 11:
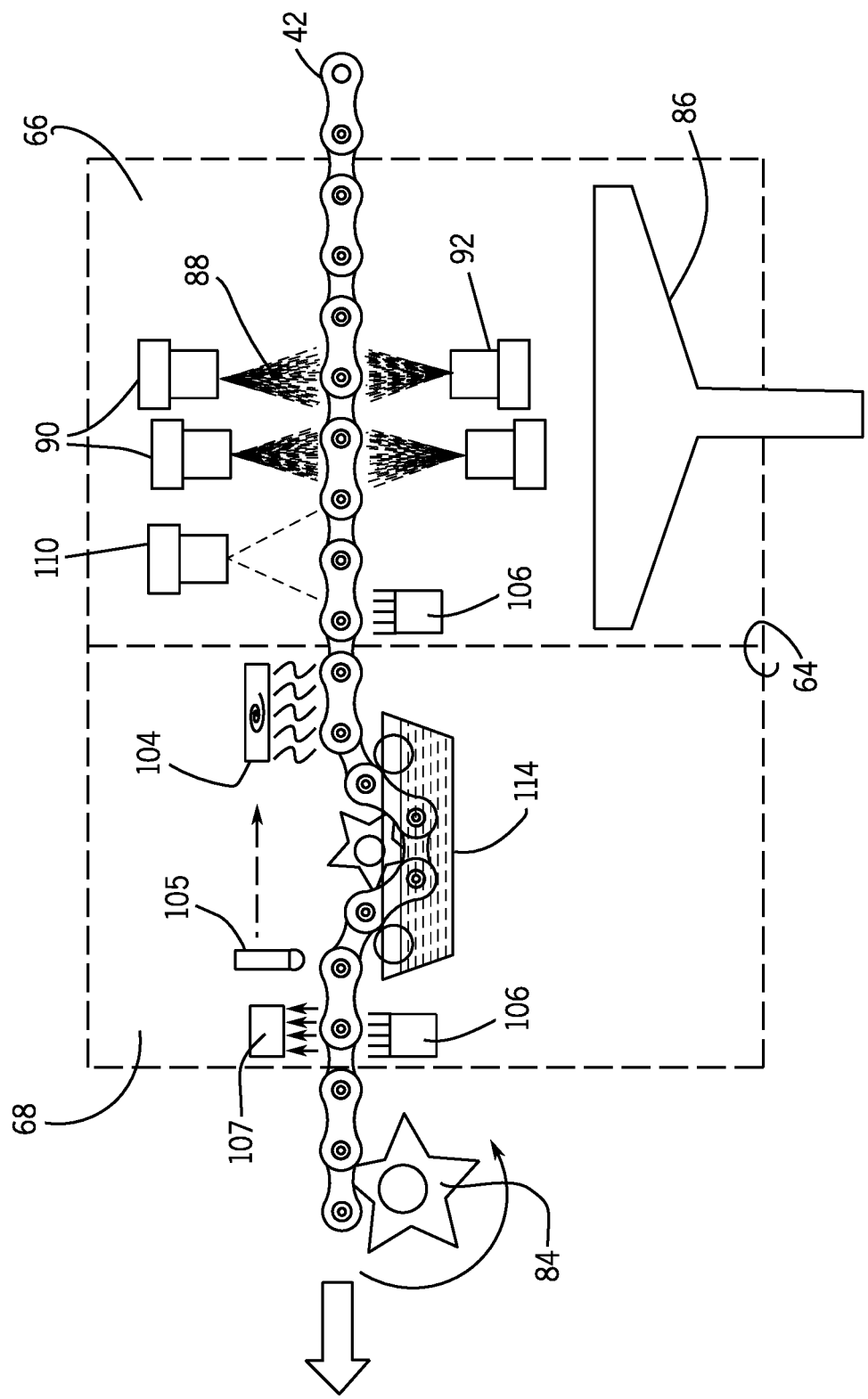
FIG. 11 is a schematic view of an alternate embodiment of internal components of a device in accordance with the present invention.

As illustrated in FIGS. 10 and 11, one or more heat exchangers 104 can be used to warm or heat the chain 42 to a desired temperature for a specific lubricant to be applied. A temperature sensor 105 can be used to monitor chain temperature and signal the controller 96 to adjust the heat exchanger 104 as necessary to maintain the chain temperature in a desired range.

FIG. 11 illustrates another embodiment similar to those described above, and with the additional or alternate feature of a lubrication trough 114 through which the chain path 56 passes. The chain 42, as it passes through the chain path 56, will be immersed in lubricant in the lubrication trough 114 for more complete coverage. The lubricant and/or chain can be heated or at ambient temperatures to provide further improvements to coverage. A trough can also be used for cleaning fluid to improve cleaning.

A brush 106 or pad can be disposed next to the chain path 56 and in contact with the chain 42 to wipe off excess lubricant and make a more uniform coating of the lubricant. The brush 106 could also be replaced with a vibrator to enhance cleaning or the application of lubricant.

A performance sensor 107 can be disposed adjacent to the chain path 56 to sense the uniformity and/or density of the lubricant coverage, for example. The performance sensor 107 may sense "tracers" in the lubricant, as described below. Other sensor functions can also be performed.

Figure 12:
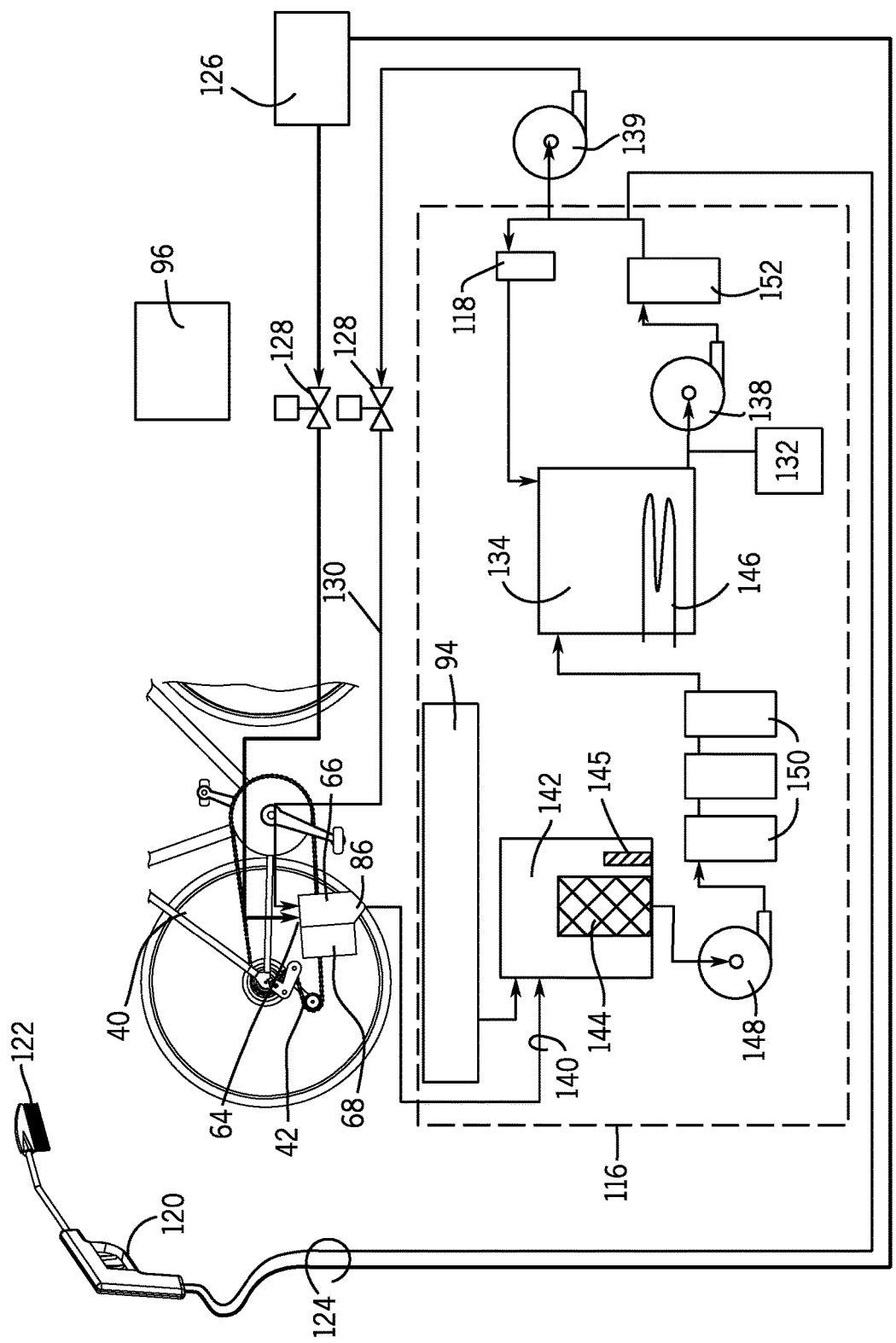
FIG. 12 is a schematic view of fluid processing components for a device in accordance with the present invention.

FIG. 12 shows a schematic arrangement of a support system 99 for the cleaning and lubricating device 64. Generally, cleaning fluids and lubricants must be provided in sufficient quantities at a proper sequence to perform the functions described above. In addition, used and excess cleaning fluids must be collected for disposal and/or recycling.

FIG. 12 illustrates a preferred support system 99, including: an automated and programmable control 96 that communicates with various components, such as pumps, valves, heaters, sensors, and chain drives either wirelessly or via appropriate wires and cabling. Improved automation together with the mechanical components described herein enable the link chain 42 to remain on a bicycle or other device while cleaning and lubricating take place.

The support system 99 includes a cleaning fluid supply 130 line and tank 132 from which fresh cleaning fluid can be drawn. The cleaning fluid is supplied through a circulation pump 138, a high pressure pump 139, a control valve 128, through a conduit 136, and into the cleaning module 66. Suitable conduits and hoses are provided for communicating fluids between the components described herein.

Also preferably, a pressure regulator 118 is provided between the circulation pump 138 and the high pressure pump 139 to recycle cleaning fluids when the high pressure pump is off or that are at an excessive pressure or quantity before reaching the high pressure pump 139.

In addition, a compressor 126 is provided for cleaning liquid lines and to drive off excess dirt and cleaning fluid from the chain and other bicycle parts. A control valve 128 can be provided for controlling compressed air to the cleaning and lubricating device 64.

When a hand wand 120 is used, the cleaning fluid and air can be directed through hoses 124 and controlled by a suitable trigger or valve on the hand wand 120. A brush 122 can also be provided on the hand wand 120 to scrape grease off of bicycle parts.

While the general flow path of cleaning fluids is from the supply tank 130 through the pumps 138 and 139 and the control valve 128, other components can be used when desired to recycle cleaning fluid or other optional processes.

For example, when recycling is desired, FIG. 12 illustrates an overspray collector 86 and an optional drip pan 94 that receive overspray and drips of cleaning fluid that is likely contaminated by grease and dirt from the bicycle chain and other parts.

The overspray collector 86 and drip pan 94 drain through a return conduit 140 to a recycle tank 142. Preferably, in the recycle tank 142 is a magnet 145 for attracting metal shavings that would damage pumps and filters in the recycling system. Also, a course filter 144 is preferably provided in the recycling tank 142 or immediately downstream to screen out relatively large debris from the fluid.

To filter cleaning fluid, the used degreaser fluid can be directed from the spray head 90 and drip pan 94 through a coarse screen 144 and into a container as described above, (see: FIG. 12) where debris would be allowed to settle. The fluid is then drained off preferably at mid-level in a settlement tank.

The degreaser is preferably handled in an environmentally responsible way, so in preferred embodiments water based degreasing agents are by themselves listed as biodegradable and environmentally safe when new. However, once the degreaser is used, it can be considered hazardous waste with the addition of the residual lubricants and metal filings. Since the degreaser is captured during the process, it is possible to coordinate with a global hazardous waste service supplier to handle recycling the used degreaser and any other waste from the process.

Preferably, the cleaning fluid is recycled and used in the cleaning module again. From the recycle tank 142, the used cleaning fluid passes to a recirculation pump 148 and through a multistage filter 150 before entering a clean tank 134 for storage until needed for another link chain cleaning operation. A final filter 152 is preferably provided downstream from the circulation pump 138. The various components are described in a preferred arrangement and order, but other recycling arrangements are possible. Visual inspection, electronic 'cleanings' counter or electronic turbidity sensor can be used to indicate time for fluid and filter replacement.

In addition, the cleaner supply tank 130 can be the same tank as the recycle system's clean tank 134. Other supply tanks for water, cleaning fluid concentrate, cleaning fluid additives, or other cleaning fluids can be added and directed through the illustrated system or a similar system using an appropriate controller.

It is also possible to include a heat exchanger 146 in one of the tanks 132 or 134, or around any of the conduits or pumps in the system, so that the cleaning fluid can be warmed or heated, as described above, to enhance cleaning or avoid freezing in cold conditions.

Cleaning fluids can be used at any desired temperature, such as being heated or turned to steam to improve performance, and preheat the chain 42 for the lubrication phase described below.

After the chain 42 has been completely degreased and cleaned, the moving parts of the chain 42 are lubricated. In one embodiment, a liquid lubricant is applied with at least one nozzle 100, and preferably two nozzles 100 and 102 or any suitable conduit to drip or inject the lubricant into the area between the inner and outer plates 44 and 47 similar to the flow paths illustrated in FIGS. 7 and 8, for example. Preferably, the nozzles 100 and 102 apply the lubricant between the inner and outer plates 44 and 47, specifically at the pin area 46. Using high pressure or high vacuum nozzles reduces the amount of lubricant used and reduces the amount of excess lubricant that can attract dirt, but low pressure nozzles or even gravity fed fluids can be used in the present invention, as described above in relation to FIGS. 9 to 11, for example. Also, brushes 106 or a wiping pad or surface can be used to spread lubricant and/or maintain the lubricant on the chain 42.

Figure 13:
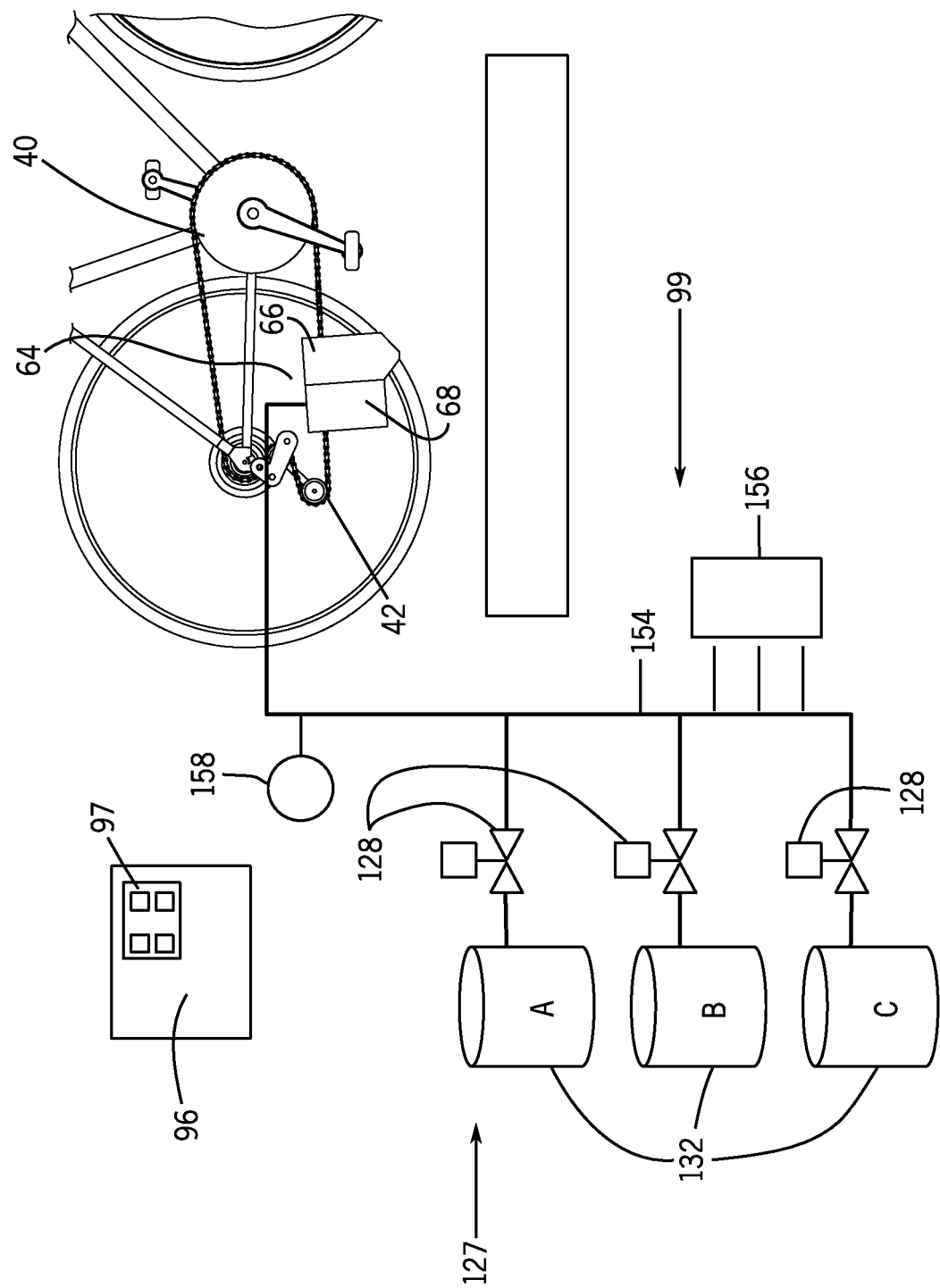
FIG. 13 is a schematic view of fluid sources for use in the present invention.

When liquid lubricant is used (as opposed to a meltable solid), the device 64 is preferably connected to sources or reservoirs containing different types of lubricants. FIG. 13 illustrates a lubricant supply system 127 for supplying the lubricating module 68. Again, the controller 96 is provided with pre-programmed operations or a user-controlled keypad or touchpad 97 to supply lubricant of the desired composition, temperature, and pressure, and at the appropriate time in the operation.

Various lubricant components are provided in tanks 132 A, B, C, and released through control valves 128 in sequence or simultaneously for mixing in the mixing conduit 154, which may include a static mixer.

In place of the three separate tanks 132 A, B, C, a single lubricant supply tank or any number of tanks can be provided. The tanks 132 can be made of any suitable material, including metal, glass, or plastic. An optional lubricant heat exchanger 156 can also be provided. A lubricant pump 158 can be provided or the lubricant can be gravity-fed or suction fed.

The type of lubricant applied is preferably selected to match the style of riding that the bike would be used for, and it can be selected manually by a control pad or automatically based on other considerations, including ambient conditions, for example. (See FIG. 13). Such selections could be for a 'dry' solvent-based lubricant for the racer or a heavy oil for the mountain bike rider. Another possibility is connecting the lubrication nozzle(s) 100, 102 to lubricating components that are blended in bulk or by in-line mixers to create a custom blend for specific types of riding or conditions.

Lubricants that are solid at room temperature, like paraffin or a proprietary mix including wax could also be applied by heating the chain 42 or by melting the lubricant just prior to application. For solid lubricants to penetrate completely, the chain 42 is preferably heated by a heat exchanger 104 to a temperature above the solid lubricant melt point when applied. Using a heated degreasing solution raises the chain temperature as well, but further heating of the chain may be required. (See: FIG. 10, for example.)

In a specific embodiment, the melt point of wax-based lubricants is normally 125 degrees F. to 225 degrees F. Further, to avoid damage, chain temperature must be kept below the melting point of existing plastic components used in the bike's drive train 48. So, the temperature used must be kept within such a range. The chain 42 can be heated by any suitable heat exchanger 104, such as by flame, induction, resistance heater, infrared heater or electrical resistance. One embodiment includes an inductance coil and control, through which the chain 42 travels, as a high frequency AC current is applied to the coil. The coil is preferably U-shaped to allow the chain 42 to go through the coil without having to remove it from the bike 40. An infrared sensor 105 can be used to detect the chain temp and adjust the power to the inductive circuit to maintain ideal temperature. (See FIG. 10.)

The lubricant can also be melted before application, and dripped or otherwise forced to flow from the top down, injected between the inner and outer chain plates 44, brushes or other direct contact device can be used to ensure thorough application and reduce over-spray. In an alternate embodiment, the chain 42 can also be immersed in the liquid lubricant contained in a trough 114 while being rotated slowly through the device 64 and around the drive train 48 (See FIG. 11) and used in combination with other application methods.

An alternate embodiment employs pre-molded solid lubricant 108 into a stick form, for example, that is pressed against a chain 42 as it is being heated by a heat exchanger 104 or by friction, and moved through the lubrication module 68. (See: FIG. 10.) Contact with the warm chain 42 and/or friction causes the stick of lubricant to melt and coat the chain 44. The shape of the stick can be selected to match the dimensions of the chain 42 and chain parts for efficiency of application and to minimize waste. Various colors of lubricants can also be used to provide visual verification that application is complete and uniform or to designate the type of lubricant. A compressed air nozzle 110 activated right after application could force hot lubricant around and between chain parts and also cool the chain, if desired.

The system diagrams illustrated in FIGS. 9 to 11 and described above depict both the degreasing module 66 and the lubricating module 68, but only one or the other may be used and they may be mounted in separate housings. Also, it is possible to have multiple modules of each type to apply a variety of cleaners and/or lubricants. When multiple modules are used, they can be identical or have different configurations to apply different lubrications, for example. The physical relationship of which module the chain 42 enters first is based on many factors. Since the chain 42 preferably makes multiple passes through both modules 66 and 68, each module is preferably operated in sequence by the automated control 96 or by a manual override. There may be some time advantages to arranging the cleaning module 66 before the lubricating module 68, but the arrangement could be reversed and still function properly.

As stated above, the chain drive system 48 also consists of the gear cluster 49 located on the rear wheel, the chain ring 51 on the crank and possibly small derailleur cogs 53 under the derailleur. These should also be cleaned and degreased as part of the process. Because each bicycle 40 is a little different, the arrangements may vary, but in one embodiment, an attachment to the pressurized degreasing circuit is used to clean these gears and cogs using a hand wand 120, for example, or another module in fluid communication. (See FIG. 12.) This attachment could be manually deployed or automated utilizing position sensors and mechanisms to locate and clean the gears.

The degreasing module 66 and lubrication module 68 can be controlled by the programmable logic controller 96. Timers or performance feedback data can be processed in the controller 96 to determine the length of each programmed step of the cleaning and lubricating process. The program can incorporate different lubricant compositions to customize the cycle for the type of bike or type of riding done by the customer. (See FIG. 13.) Further, manual overrides can be made using a key pad or touch pad 97 to address any condition.

Sensors 105 can also be used to provide cleaning and lubricating data that is used by the controller 96 to make changes to the process. For example, a specific lubricant can be entered by the operator into the controller 96, and the controller 96 will automatically adjust the variables described above to optimize the operation for that cleaner or lubricant.

Also, various performance monitoring sensors 107 can be used to detect the presence or absence of dirt or lubricant or both in the chain 42, and communicate related data to the controller 96. The controller 96 can use the sensor data to ensure adequate coverage without over-application and waste. Further, lubricant or cleaning fluids can include various tracers that can be more easily monitored by appropriate sensors, such as fluorescent dyes, conducting materials, reactive nanoparticles such as superparamagnetic beads or optic imaging, as examples.

The controller 96 can be a fuzzy logic controller that adjusts cleaning times, cleaning fluid concentrations, lubrication types and quantities, and so on, based on a series of cleaning and lubricating processes, algorithms, operator input, and changing ambient conditions, for example, regardless of location, such as at a bike race, for example.

Example Method:

Install bike onto stand.

Interface degreaser/lubricator head onto chain

Start auto-cycle

Chain is moved forward at desired speed

Use the brush wand to quickly clean chain ring, gear cluster and derailleur wheels (the brush wand can be manual or automated.)

Both right and left degreaser jets are started for >1 Full Chain Rotation (FCR)

Left degreaser jet is turned off to force degreaser one way through pin gap for >FCR Right degreaser jet is turned off and left degreaser jets turned on.

Left degreaser jet is turned off and compressed air is turned on through left jet to blow degreaser from pin area>FCR Compressed air is also turned on through Right degreaser jet to blow excess degreaser off chain>FCR Additional nozzles optionally cycled to further clean and dry the chain.

Start Lubrication drip>FCR
Chain rotates while lubrication is dripped over chain
Alternate hot wax application process
Use induction, radiation or other suitable method to increase chain temp to proper melting temperature (125 to 225 degrees F.) and/or monitor adequacy of lubrication
Apply hot wax or lubricant using:
  Drip, immersion or hard stick applied to hot chain;
  Low pressure air used to remove excess lubrication; and
  Continue to rotate the chain to work lubricant into the chain.

Additional embodiments can include: High frequency vibration of the chain 42 while degreasing/lubricating for improved coverage and reduced application time; bending the chain 42 laterally or otherwise forcing larger gaps between plates and pins can improve cleaning and lubricant coverage; and applying heat to help liquefy old grease during cleaning either directly or with heated degreaser can improve results. The cleaning and degreasing fluid can be water, preferably pressurized and possibly heated.

The cleaning fluid can also be other fluids containing detergents, and surfactants. Foaming is typically not desired, so antifoaming agents can be added. The detergents and other ingredients can be applied as concentrates or mixed with a carrier, such as water, before application or as the solution is applied. The device can include any suitable form of mixer, such as bulk mixers or in-line and static mixers. Appropriate detergents include, for example ArmaKleen's™ Bio24™, is preferably recycled for as many applications as possible to reduce the cost of cleaning fluids and impact on the environment. Other detergents include Simple Green brand detergent and other environmentally appropriate brands. As illustrated in FIG. 12, a series of filters are used to remove the particulate material before being sent to the spraying mechanism 90, 92. Additionally, a series of cleaning fluids can be applied, such as water used to clean bulk amounts of dirt, followed by detergents, and the air to rinse off the liquids.

Sample formulas for lubricants in the present invention include:

Suitable lubricants are identified in the tables below, and can include organic oils, organic waxes, and inorganic additives.

For example, organic oils such as castor oil, coconut oil, avocado oil, palm oil, and combinations thereof are preferred.

Suitable organic waxes such as raw carnauba, bees wax, microcrystalline, paraffin, candelilla, and combinations thereof are preferred. Shellac in various consistencies and colors can also be added.

Inorganic additives such as boron nitride, neodymium oxide, and combinations thereof are preferred.

TABLE 2

Sample Lubricant Formulas

| Embodiments | Classification | Ingredients | Percent of volume range |
|---|---|---|---|
| Example 1 | Organic Oil | Castor Oil | 33% ←→ 44% |
|  | Organic Wax | Raw Carnauba | 11% ←→ 33% |
|  | Inorganic Additive | Boron Nitride | 33% ←→ 44% |
| Example 2 | Organic Oil | Coconut Oil | 33% ←→ 44% |
|  | Organic Wax | Raw Carnauba | 11% ←→ 33% |
|  | Inorganic Additive | Boron Nitride | 33% ←→ 44% |
| Example 3 | Organic Oil | Avocado Oil | 25% ←→ 40% |
|  | Organic Wax | Raw Carnauba | 20% ←→ 25% |
|  | Inorganic Additive | Neodymium Oxide | 40% ←→ 50% |
| Example 4 | Organic Oil | Avocado Oil | 45% ←→ 50% |
|  | Organic Wax | Raw Carnauba | 18% ←→ 25% |
|  | Inorganic Additive | Neodymium Oxide | 25% ←→ 36% |

A colorant can be added to the lubricant composition for different functions. For example, a 'green' color can denote environmentally friendly product, indicate source, denote a different performance level product i.e. red for extra slippery performance race version or blue for long lasting touring product, be a visual indicator of coverage. Color can also be used to indicate level of lubrication remaining on the chain or to indicate if the lubricant has been put on properly. When the color diminishes it will indicate that it is time to re-apply lubricant.

Additives can be added that change the characteristics of the lubricant after it has been applied. The lubricant could go on as a very fluid liquid and penetrate deeply but the exterior could be firmed up to repel dirt and moisture. This change can be produced when the chain is exposed to environmental factors or by exposing the chain to a secondary operation. An example would be utilizing polyurethane prepolymer components to create a lubricant that is liquid when applied but firms up in the presence of humidity. Or a photopolymer additive could be added to the lubricant that would start out being applied as a liquid but subsequently firms up when exposed to UV light. A secondary operation could also be added to the lubrication process to add a layer of harder material to keep the chain clean. A material such as shellac could be sprayed or wiped on the chain to create an outer protective layer.

Flow enhancers, thickeners, modifiers to improve adherence, and other ingredients can be included as well.

Other natural additives, like nasturtium powder, can be added to repel water. Natural oils are more fragile than hydrocarbon-based oils and can have a short shelf life before starting to oxidize. Depending on the resulting shelf life of the mixed lubricant, a preservative might be required. Natural anti-oxidants such as Vitamin E, extracts of Rosemary can be used to extend the life of the product from manufacture to end of use by the customer.

Other types of ingredients can be added to the lubricants for better visual confirmation or sensing by coverage sensors, for example. Materials sensitive to UV light can be added, so that a UV light mounted on the system 50 will render applied lubricant more readily visible to the operator, or to an automatic sensor, for example.

The following example places Primary Importance in the heating and mixing process to assure even distribution of the wax/nanoparticle components.

1. Heat Primary oil base to >190° F.<212° F.
2. Add selected wax (for example, paraffin or Carnauba wax)
3. Stir gently until wax is liquefied. (10 minutes to 20 minutes or as needed)
4. Stir/Mix vigorously when completely liquified. (1 minute to 2 minutes) A simple hand-held stick blender like a KitchenAid KHB1231CU 2 Speed Hand Blender with 8" Shaft works well for this task.

5. Add selected nanoparticle powder (wait for initial absorption by liquid) then stir gently.
6. Maintain Temperature>190° F.
7. Wait 5 minutes . . . check temperature>190° F.
8. Stir/Mix Slowly then Vigorously (1 minute to 2 minutes)
9. Maintain Heat for 10 minutes>190° F. . . . Stir Vigorously: 1 minute to 2 minutes at five-minute interval.
10. At this point the heat is removed from the mix. As the mixture cools, it solidifies. The warm liquid lubricant can be loaded into the proper container, depending on the desired method of distribution. Small metal cans approximately half full that can be re-heated and chains immersed, lipstick style containers for manually replenishing the lubricant in the field or solid blocks or granules to be loaded into an automated piece of dispensing equipment (i.e. Degreaser/Lubricator with Thermal Application of Solid Lubricant)

Methods of Applying the Solid Lubricant to the Chain

Simple Manual Application Chain Off Bike
1. Use a double boiler to heat the opened can of lubricant up to 190 degrees F. At this temperature all of the lubricant is liquid.
2. Stir/Mix with a simple stir stick
3. Carefully place a new or fully degreased and clean chain into the liquid. A piece of wire attached to one side of the chain before immersion allows the chain to be pulled out and hung when done.
4. Allow the chain to stay in the liquid for at least 10 minutes. The chain must heat all the way through to allow the lubricant to fully penetrate.
5. Carefully remove the chain and hang it up and allow to cool.
6. Wipe off any excess lubricant
7. Reinstall the chain Automated Application (Block/Granular Lubricant)
1. Clean and degrease chain
2. Put block/granular of lubrication into heating chamber to liquify
3. Hot liquid lubricant flows via gravity or pumped through heated hose (i.e. commercial hot glue application equipment) to the chain
4. Chain is immersed into the liquid lubricant. The chain is rotated to apply lubricant to all of the chain links.
5. A compressed air stream can be used immediately after the application and be used to remove excess lubricant, force lubricant further into the chain and/or cool the chain before it contacts any plastic components Manual Application with Chain Still on Bike.

"Cold" Application from Lipstick-Style Container . . . .
1. Manually rotate and wipe chain as clean as possible.
2. Apply new lubricant from the lipstick container while moving chain slowly.
3. Rotate chain assembly several times, then go back to step #1 and repeat cleaning/application.
4. After application process above, apply new lubricant from lipstick tube, rotate chain assembly and wipe off access.

"Warm" Application from Lipstick Style Container . . . .
1. Manually rotate and wipe chain as clean as possible.
2. Heat chain as applicable (heat gun, portable solar or infrared heaters, etc.)
3. Apply using lipstick container while moving chain slowly.
4. Rotate chain assembly several times, then go back to step #1 and repeat cleaning/application.
5. After application process above, apply new lubricant from lipstick tube, rotate chain assembly and wipe off excess.

Mix on Demand

Other methods of mixing the components can be used such as in situ mixing that may include a heated stream of oil or melted wax and other desired components injected into it in a bulk tank or mixed inline using line turbulence or a static mixer to provide a homogenous output. Preferably, the mixture could be customized to individual requirements based on riding temp, type of riding, etc. Application can also be done by heating the chain while still on the bike and applying the lubrication via an injection mechanism.

The lubrication for bicycle chains can also be used on other chain drives or other mechanisms needing lubrication. Examples include: food processing equipment; garage door openers; gates; hoists; lift trucks; light vehicles; OEM chain manufacturers; residential elevators; service organizations; transfer cases; and utility vehicles.

The foregoing detailed description of drawings is provided for clearness of understanding only, and no unnecessary limitations therefrom should be read into the following claims.

The invention claimed is:

1. A device for cleaning and lubricating a bicycle link chain, the device comprising:
a frame not mounted to a bicycle;
a cleaning module having a housing defining a chain passage and mounted to the frame, the cleaning module configured to be supported by the frame in a fixed position relative to the chain path of the bicycle;
a chain drive system for engaging the bicycle link chain and joined to the housing to define a chain path extending in a machine direction from a chain input end to a chain output end, configured to receive a bicycle link chain in a loop on a bicycle and advance the chain through the housing of the cleaning module;
a cleaning fluid nozzle joined to the housing of the cleaning module and directed toward the chain path;
a lubricating module connected to the frame and spaced from the cleaning module along the chain path and having a lubricant dispensing station positioned along the chain path to apply lubricant to the chain to thereby lubricate the chain.

2. The device of claim 1, and further comprising:
an opposing cleaning fluid nozzle disposed in a substantially opposing direction to the cleaning fluid nozzle, and directed toward the chain path.

3. The device of claim 1, and further comprising:
an air nozzle joined to the housing and directed toward the chain path.

4. The device of claim 1, and further comprising:
a cleaning fluid trough through which the chain path passes.

5. The device of claim 1, and further comprising:
a cleaning fluid pump in fluid communication with the cleaning fluid nozzle; and
a controller in communication with the cleaning fluid pump to dispense cleaning fluid through the cleaning fluid nozzle.

6. The device of claim 1, and further comprising:
a cleaning fluid collection reservoir joined to the housing to receive cleaning fluid from the cleaning fluid nozzle.

7. The device of claim 1, and further comprising:
a recycle filter in fluid communication with the cleaning fluid collection reservoir.

8. The device of claim 1 wherein the chain drive system is operable by an automated controller to intermittently advance the chain to thereby index the chain to position the cleaning nozzle to a selected part of the chain for an extended period.

9. The device of claim 1 wherein a vertical plane is defined perpendicular to the chain path and wherein the nozzle is a flat pattern nozzle with a flat spray pattern arranged parallel to said vertical plane to provide flow into the a space between inner and outer plates of a bicycle chain.

10. The device for cleaning and lubricating a bicycle link chain of claim 1 further comprising a heater positioned along the chain path to heat the bicycle chain moving along the chain path, wherein the lubricant dispensing station is positioned along the chain path to apply lubricant to the chain after the chain has been heated by the heater.

11. The device of claim 10 wherein the heater comprises a U-shaped induction coil configured to receive said bicycle chain as it travels along the chain path.

12. The device of claim 10 further comprising an infrared sensor positioned to detect a temperature of the bicycle chain once heated by the heater, the sensor connected to adjust the power to an inductive circuit of the U-shaped induction coil to maintain a desired temperature.

13. A device for cleaning a bicycle link chain defining a loop and mounted on a bicycle, the device comprising:
 a frame not mounted on the bicycle;
 a housing mounted to the frame and having a housing lower portion, and a housing upper position joined to the housing lower portion and movable on guides so the housing upper portion can be spaced vertically from the housing lower portion to open a chain path extending from an inlet of the housing to an outlet of the housing spaced in a machine direction from the inlet;
 at least one spray nozzle connected to the housing upper portion and connected to a source of cleaning fluid and operable to spray cleaning fluid downwardly on a chain traveling along the chain path;
 a least one spray nozzle connected to the housing lower portion and connected to the source of cleaning fluid, and operable to spray cleaning fluid upwardly on a chain traveling along the chain path;
 an actuator connected to the upper portion to move the upper portion, the lower portion or both, for opening the chain path for insertion of a looped bicycle chain;
 at least one cog mounted to the housing lower portion along the chain path; and
 a chain drive mounted to drive the at least one cog and operable to engage a chain extending along the chain path and to advance the chain through the housing.

14. An automated device for cleaning a bicycle link chain defining a loop and mounted on a bicycle, the device comprising:
 a frame not supported on the bicycle;
 a housing mounted to the frame, the housing having an inlet and an outlet spaced in a machine direction from the inlet, wherein a chain path is defined between the inlet and the outlet;
 a plurality of spray nozzles mounted within the housing and connected to a supply of cleaning fluid and a supply of compressed air;
 at least one cog mounted to the housing along the chain path;
 a chain drive mounted to drive the at least one cog and operable to engage a chain extending along the chain path and to advance the chain through the housing; and
 an automated programmable controller that controls the driver to intermittently advance the chain within the housing to thereby index the chain to position the cleaning nozzle to a selected part of the chain and to operate the plurality of spray nozzles to discharge cleaning fluid at a selected location for an extended period, before advancing the chain past said plurality of spray nozzles.

15. The device of claim 14 further comprising an encoder associated with the chain drive and the controller for enabling the indexing a chain along the chain path or to control the number of passes the chain makes through the housing.

16. A device for lubricating bicycle link chain mounted to a bicycle, the device comprising:
 a lubricating module with an inlet and an outlet defining a chain path fixed in relationship with a chain loop path of the bicycle link chain, wherein the module is mounted to a frame not mounted on the bicycle;
 a drive mechanism separate from the bicycle and positioned to engage the bicycle link chain on the bicycle and operable to advance the bicycle link chain along the chain path;
 a heater disposed along the chain path and directed to heat the bicycle link chain as it moves along the chain path; and
 a device containing solid wax lubricant mounted to the frame and positioned along the chain path and to dispense the solid wax lubricant on the heated chain as it moves along the chain path.

17. The device of claim 16 wherein a lubricant heater is disposed to liquefy the solid wax lubricant prior to its being dispensed on the heated chain.

18. The device of claim 16 further comprising a temperature sensor positioned to detect the temperature of the heater and to control the heater within a desired temperature range.

* * * * *